H. CAPLAN.
AUTOMOBILE FENDER.
APPLICATION FILED OCT. 22, 1921.
1,423,187.
Patented July 18, 1922.
2 SHEETS—SHEET 1.
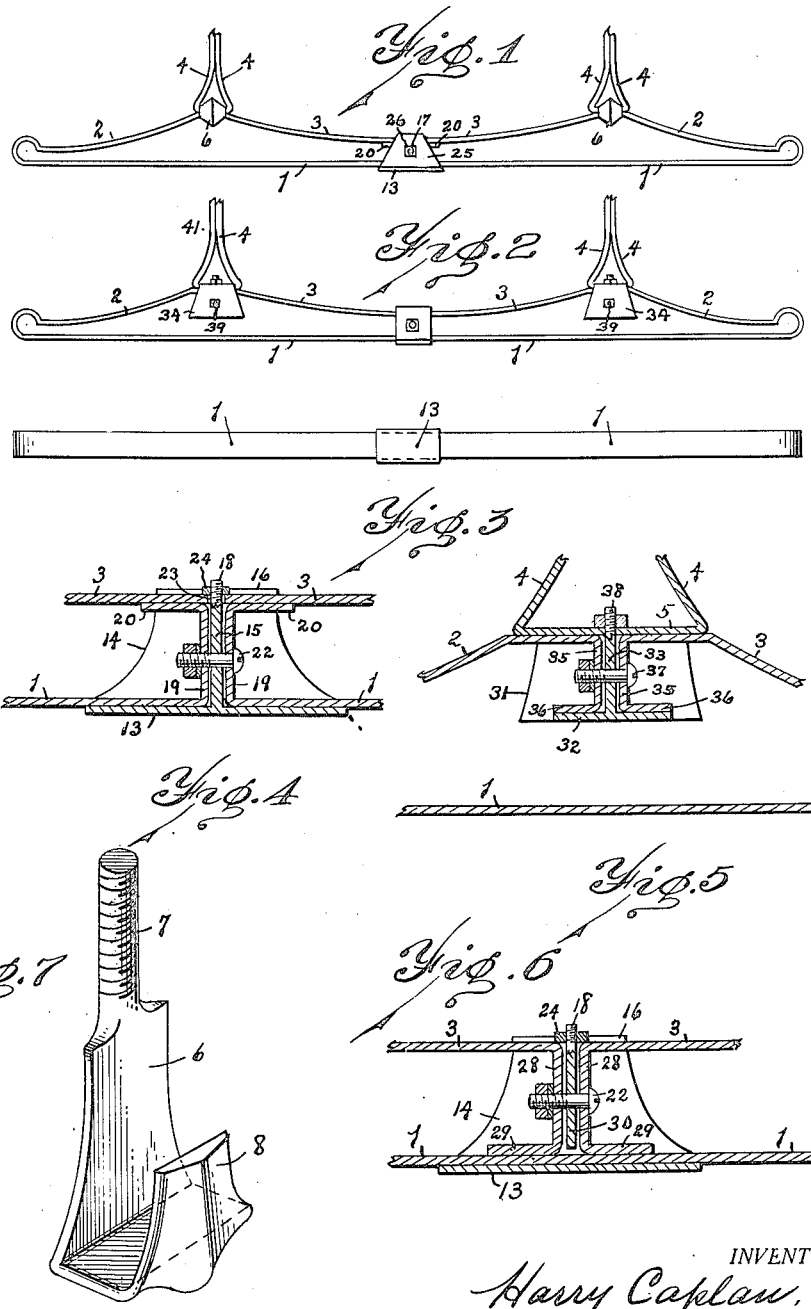
INVENTOR.
Harry Caplan,
BY Edward N. Pagelsen
ATTORNEY.

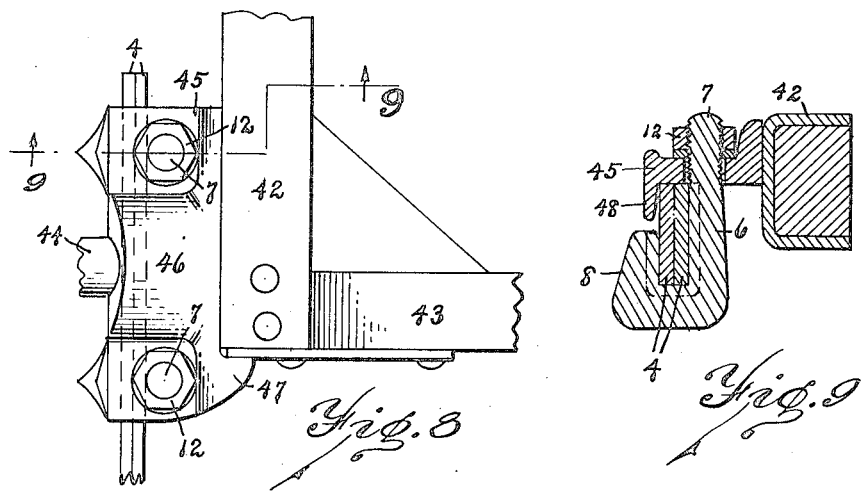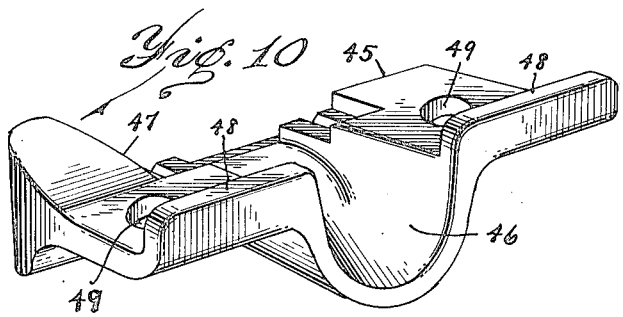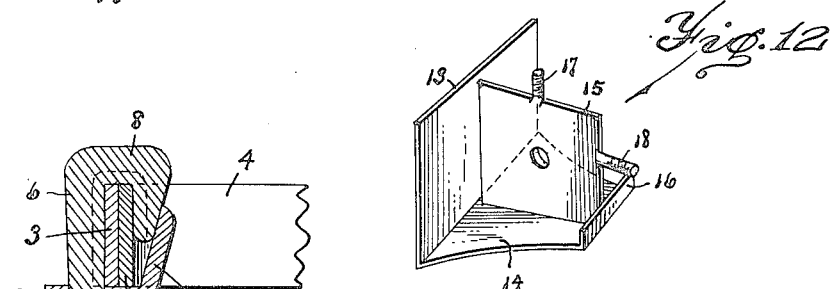

UNITED STATES PATENT OFFICE.

HARRY CAPLAN, OF DETROIT, MICHIGAN.

AUTOMOBILE FENDER.

1,423,187.  Specification of Letters Patent.  Patented July 18, 1922.

Application filed October 22, 1921. Serial No. 509,644.

*To all whom it may concern:*

Be it known that I, HARRY CAPLAN, a citizen of the Dominion of Canada, and residing at Detroit, in the county of Wayne and State of Michigan, have invented a new and Improved Automobile Fender, of which the following is a specification, This invention relates to the construction of fenders especially adapted for light automobiles, and its object is to provide a simple strong fender which can be readily attached to the vehicle.

This invention consists of a fender comprising front and rear portions preferably bent up of a flat bar of steel and in either one or more pieces which are united by novel coupling devices extending across between the front and rear portions at the middle of the fender.

It further consists of a base adapted to fit the side bar of the vehicle at a fender brace and to receive the bracket portion of the fender which is attached to the base and the bracket to hold the fender in the desired position.

It further consists in the details of construction illustrated in the accompanying drawings and particularly pointed out in the claims.

In the drawings, Figs. 1 and 2 are plans of two fenders embodying the present invention. Fig. 3 is a front elevation of the fender shown in Fig. 1. Fig. 4 is a central horizontal section of the coupling device used in the fender shown in Fig. 1. Fig. 5 is a similar section of the fender shown in Fig. 2 at the points of attachment of the supporting brackets. Fig. 6 is a modified form of the construction shown in Fig. 4. Fig. 7 is a perspective of a hook bolt. Fig. 8 is a plan of the clamp plate by means of which the fender bracket may be attached to the front end of a Ford automobile. Fig. 9 is a section on the line 9—9 of Fig. 8. Fig. 10 is a perspective of this clamp plate. Fig. 11 is a central vertical section through the hook bolt for securing the fender to its bracket. Fig. 12 is a detail of a coupling frame.

Similar reference characters refer to like parts throughout the several views.

The fenders shown in the drawings are preferably made of flat steel bars about two inches wide and one-fourth inch thick and may be made up of one, two or three pieces. The fender shown in Fig. 1 is formed from a single bar which may be said to be made up of the two front sections 1, the two outer rear sections 2 and the two inner rear sections 3. These sections 2 and 3 are attached to supporting brackets, each consisting of the sides 4 and the front cross bar 5 by means of a hook bolt 6 having a shank 7 and a lip 8 (Figs. 7 and 11) to extend down back of the part 5 of the bracket. A clamp 9 having an inclined lip 10 is mounted on the bolt, the lip extending up back of the part 5 and the parts being drawn together by the nut 12.

In Figs. 4 and 12 are shown the main portion of the coupling member which unites the parts 1 and 3 of the main bar. This member consists of a front plate 13, bottom plate 14, center plate 15 and a small flange 16. The threaded stud bolts 17 and 18 are formed on this center plate 15. As shown in Fig. 4, the two front portions 1 of the main bar have rearwardly turned portions 19 and outwardly turned ends 20 which fit against the front plate 13, middle plate 15 and bottom plate 14 of the coupling member, being held in position by the bolt 22. The rear portions 3 are integral and the stud 18 extends through a small hole 23 therein, a nut 24 drawing the parts together. A top plate 25 is secured by the stud 17 and the nut 26 against the upper edges of the parts of the fender which is thus rendered rigid by this coupling. The flange 16 serves to assist the stud 18.

If desired, the two sections 1 may be integral as shown in Fig. 6 and the two rear sections 3 may have forwardly extending portions 28 and outwardly extending ends 29. The front plate 13 and bottom plate 14 of the coupling are the same as before but the center plate 30 is not united to the front and bottom plates. The same stud bolts 17 and 18, the bolt 22, the top plate 25 and nut 26 may be used as before described.

Instead of joining the ends of the bar at the middle of the fender, it may be joined at one of the brackets or at both, although the bar may be three pieces, the ends thereof being joined as shown in Fig. 4 and at the brackets as shown in Fig. 5. The coupling has a bottom plate 31, front plate 32, center plate 33 and top plate 34 shown in Fig. 2. The parts 2 and 3 have forwardly turned portions 35 and outwardly turned ends 36. The bolt 37 and the stud bolts 38 and 39 are again employed. The coupling 40 at the middle of the fender may be of any desired construction.

While any desired means may be employed to secure the fender-supporting brackets in position, the device shown in Figs. 8, 9 and 10 has been found satisfactory for automobiles of the Ford type. The side bars 42 are connected across by a front cross bar 43 and an upwardly and outwardly extending rod 44 extends from each side bar. A clamping plate 45 is formed with a saddle 46 to fit on this rod and also has flanges 48 adapted to engage the sides 4 of the bracket. Hook bolts 6 such as shown in Fig. 7 have their shanks 7 extending through the holes 49 in this clamp plate and the hook 8 thereon engages these sides 4, as shown in Fig. 9, and draws them up against the rod 44, so that when thus drawn up by the nuts 12, the side bar 42, clamp plate 45 and bracket are securely united.

The details of construction and proportions of the parts of this fender may all be changed by those skilled in the arts without departing from the spirit of my invention as set forth in the following claims.

I claim :—

1. In an automobile fender, the combination of a clamping plate adapted to fit against a side frame of a vehicle and having a saddle portion adapted to extend over a brace bar, a fender bracket having parallel flat portions adapted to fit against said clamping plate and brace bar, and bolts mounted in the clamping plate and adapted to engage the bracket to secure the clamping plate and bracket to the side frame of the vehicle.

2. A fender consisting of a central rear portion between supporting brackets, end rear portions extending outward from the brackets and front portions extending inward from the outer ends of the end rear portions, and a coupling member uniting the inner ends of said front portions, the inner ends of the front portions being bent rearwardly and then outwardly and said coupling member consisting of plates fitting between and around said bent inner ends and bolts to draw the parts together.

3. A fender consisting of front and rear portions united at their ends, one of said portions being in two parts having their ends bent twice at right angles, and a coupling member connecting said ends and consisting of three plates extending along one side, the top and the bottom of said two parts, and bolts to secure the ends and plates together.

4. A fender consisting of a flat metal bar bent into the form of a flat loop and brackets to support the same, the ends of the bar meeting at the middle of one of the sides of the loop and being bent back on themselves, and a coupling device uniting the ends of the bar and the other flat side of the loop and embodying a bolt extending through holes in the ends of the bar.

5. A fender consisting of a flat metal bar bent into the form of a flat loop and brackets to support the same, the ends of the bar meeting at the middle of one of the sides of the loop and being bent back on themselves, and a coupling device uniting the ends of the bar and the other flat side of the loop and embodying a bolt extending through holes in the ends of the bar, the brackets being attached to one of said flat sides at equal distances from the ends thereof.

6. A fender consisting of a flat metal bar bent into the form of a flat loop and brackets to support the same, the ends of the bar meeting at the middle of one of the sides of the loop and being bent back on themselves, and a coupling device uniting the ends of the bar and the other flat side of the loop, said coupling device consisting of top and bottom plates to engage the top and bottom edges of both said flat sides of the loop, a central plate integral with one of the other plates and extending between said ends of the bar, a front plate integral with the central plate, and bolts to secure the parts together.

7. In an automobile fender, the combination of a clamping plate adapted to fit against a side frame of the vehicle and having a saddle portion adapted to extend over a brace bar, a fender bracket having parallel flat portions adapted to fit against said clamping plate and brace bar, and hooked bolts mounted in the clamping plate and adapted to engage the bracket to secure the clamping plate and bracket to the side frame of the vehicle.

8. A fender consisting of a central rear portion between supporting brackets, end rear portions extending outward from the brackets and front portions extending inward from the outer ends of the end rear portions, a coupling member uniting the inner ends of said front portions, said brackets being formed from flat bars and each consisting of a front cross bar and rearwardly extending sides lying flat against each other, and means to secure the brackets to the fender.

9. In an automobile fender, the combination of a clamping plate adapted to fit against a side frame of a vehicle, a fender bracket having parallel flat portions adapted to fit against said clamping plate, and bolts mounted in the clamping plate and adapted to engage the bracket to secure the clamping plate and bracket to the side frame of the vehicle.

HARRY CAPLAN.